(12) United States Patent
Shibuno et al.

(10) Patent No.: US 7,978,967 B2
(45) Date of Patent: Jul. 12, 2011

(54) CAMERA BODY, INTERCHANGEABLE LENS, AND IMAGING APPARATUS

(75) Inventors: Koji Shibuno, Osaka (JP); Mitsuyoshi Okamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 70 days.

(21) Appl. No.: 12/465,897

(22) Filed: May 14, 2009

(65) Prior Publication Data
US 2009/0285572 A1 Nov. 19, 2009

Related U.S. Application Data

(60) Provisional application No. 61/053,815, filed on May 16, 2008.

(30) Foreign Application Priority Data

Jun. 3, 2008 (JP) ................................. 2008-145687
Apr. 20, 2009 (JP) ................................. 2009-101880

(51) Int. Cl.
*G03B 17/00* (2006.01)
(52) U.S. Cl. ........................................ 396/79; 348/363
(58) Field of Classification Search .................. 396/133, 396/79; 348/363
See application file for complete search history.

(56) References Cited

U.S. PATENT DOCUMENTS

| 4,435,058 A |   | 3/1984 | Yoshida et al. |
| 5,455,650 A | * | 10/1995 | Fujiwara ........................ 396/71 |
| 5,876,327 A | * | 3/1999 | Tsuyuki et al. ............... 600/112 |
| 2003/0007075 A1 |   | 1/2003 | Masuda |
| 2004/0190887 A1 | * | 9/2004 | Natsume ........................ 396/86 |
| 2004/0190890 A1 | * | 9/2004 | Osawa .......................... 396/234 |

FOREIGN PATENT DOCUMENTS

| JP | 3-010928 B | 2/1991 |
| JP | 3-072308 A | 3/1991 |
| JP | 2003-005245 A | 1/2003 |
| JP | 2005-037824 A | 2/2005 |
| JP | 2006-208897 A | 8/2006 |
| JP | 2008-028655 A | 2/2008 |

OTHER PUBLICATIONS

Translation of JP Publication No. 2003-337277; Inventor: Ota, Seiya; Title: Optical Apparatus; Publication Date: Nov. 28, 2003.*

* cited by examiner

*Primary Examiner* — Rodney E Fuller
*Assistant Examiner* — Fang-Chi Chang
(74) *Attorney, Agent, or Firm* — Panasonic Patent Center; Dhiren Odedra; Kerry Culpepper

(57) ABSTRACT

An interchangeable lens includes an obtaining unit for obtaining first control information and second control information from the camera body, the first control information being an instruction to control the first drive unit (diaphragm), the second control information being an instruction to control the second drive unit (focus lens, etc), a storage unit for storing the obtained second control information, and a controller for controlling the first drive unit and the second drive unit based on the first and second control information obtained. The second control information (reservation control information) is an instruction to control the second drive unit when the obtaining unit receives the first control information after receiving the second control information. When the obtaining unit obtains the first control information after obtaining the second control information, the controller drives the first drive unit and the second drive unit in parallel based on the obtained first control information and the stored second control information.

11 Claims, 13 Drawing Sheets

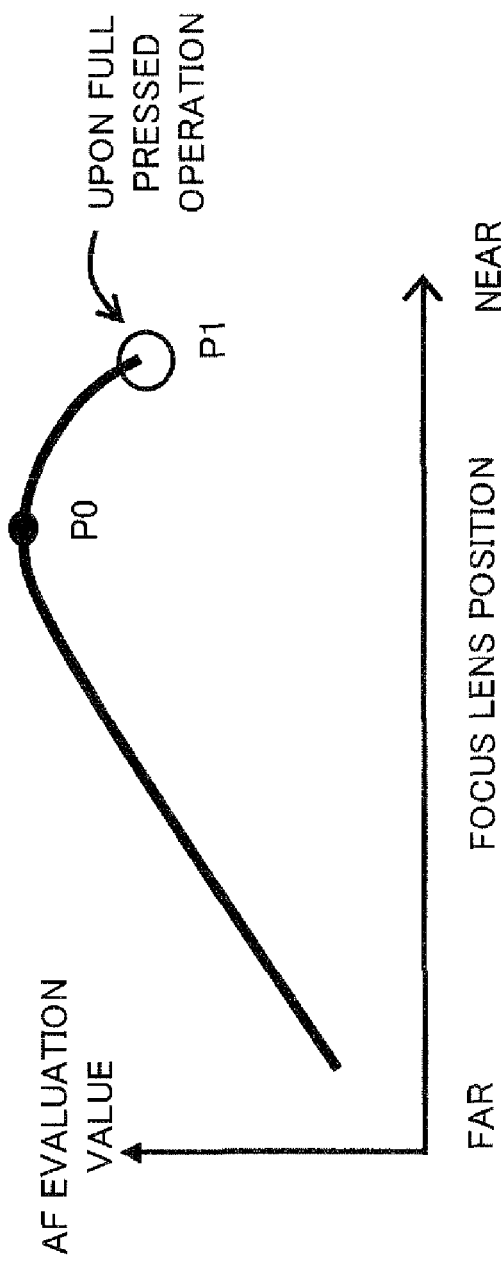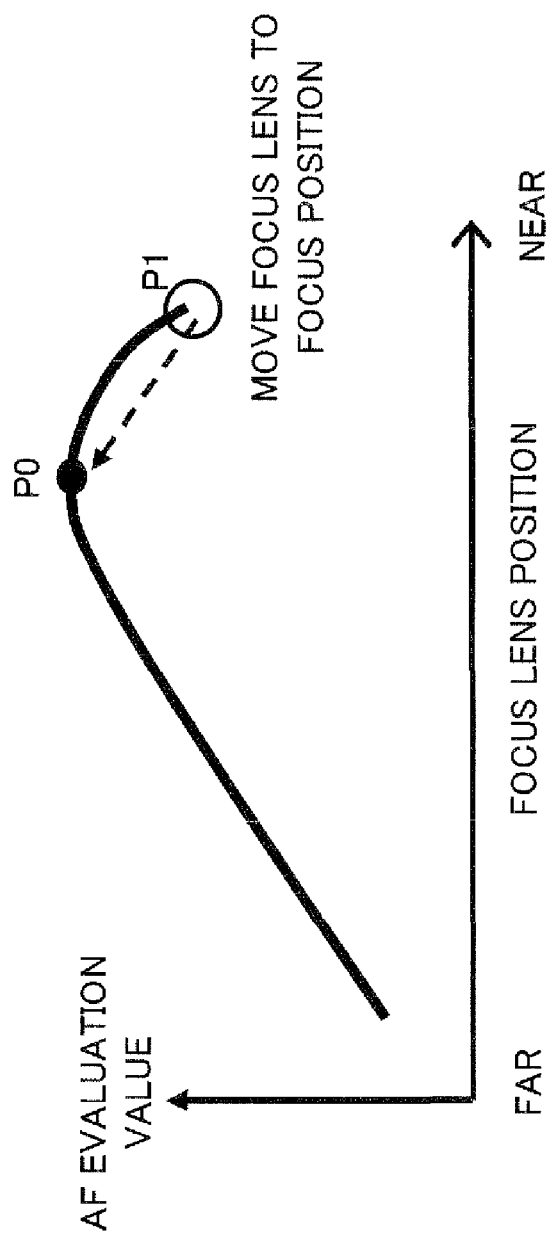
Fig. 5A
Fig. 5B

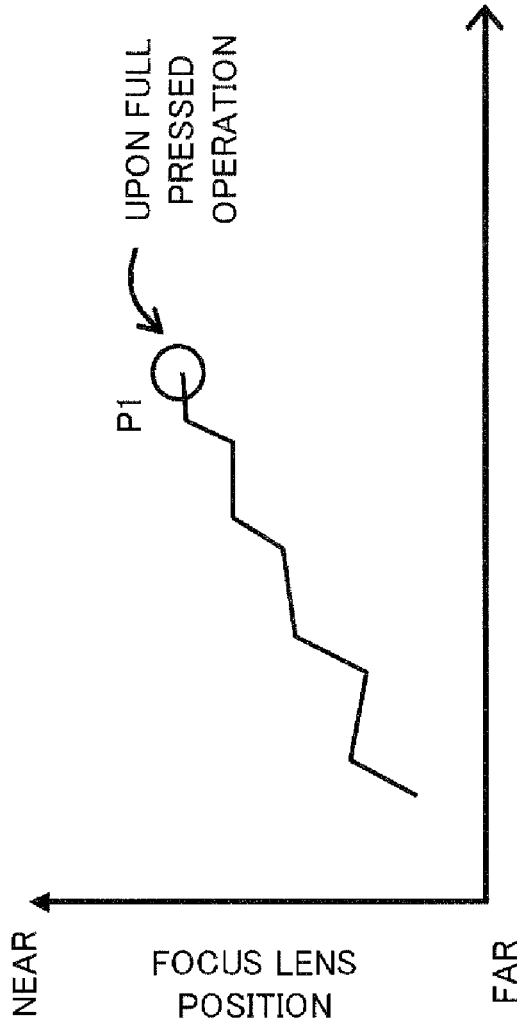
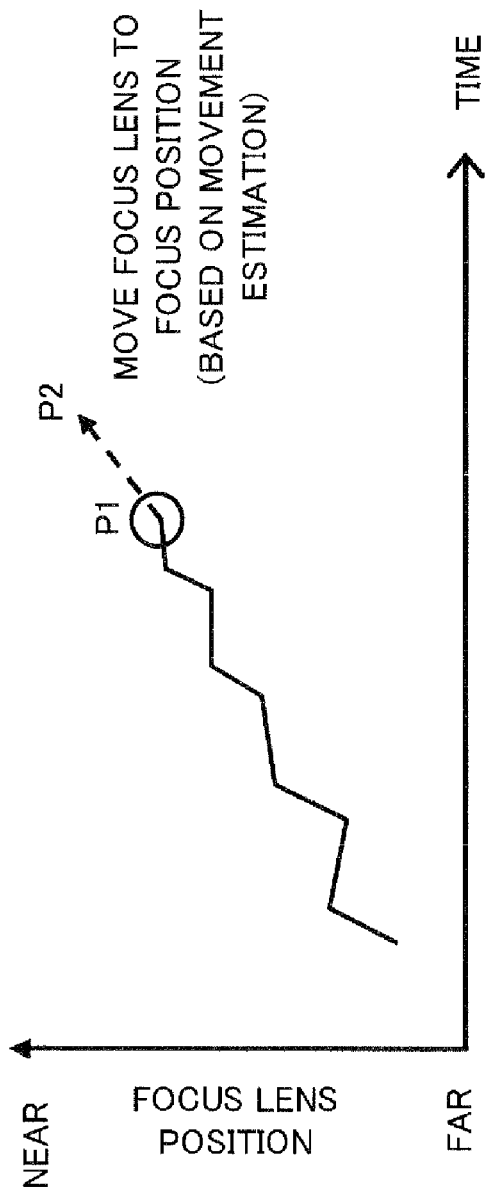
Fig. 6A
Fig. 6B

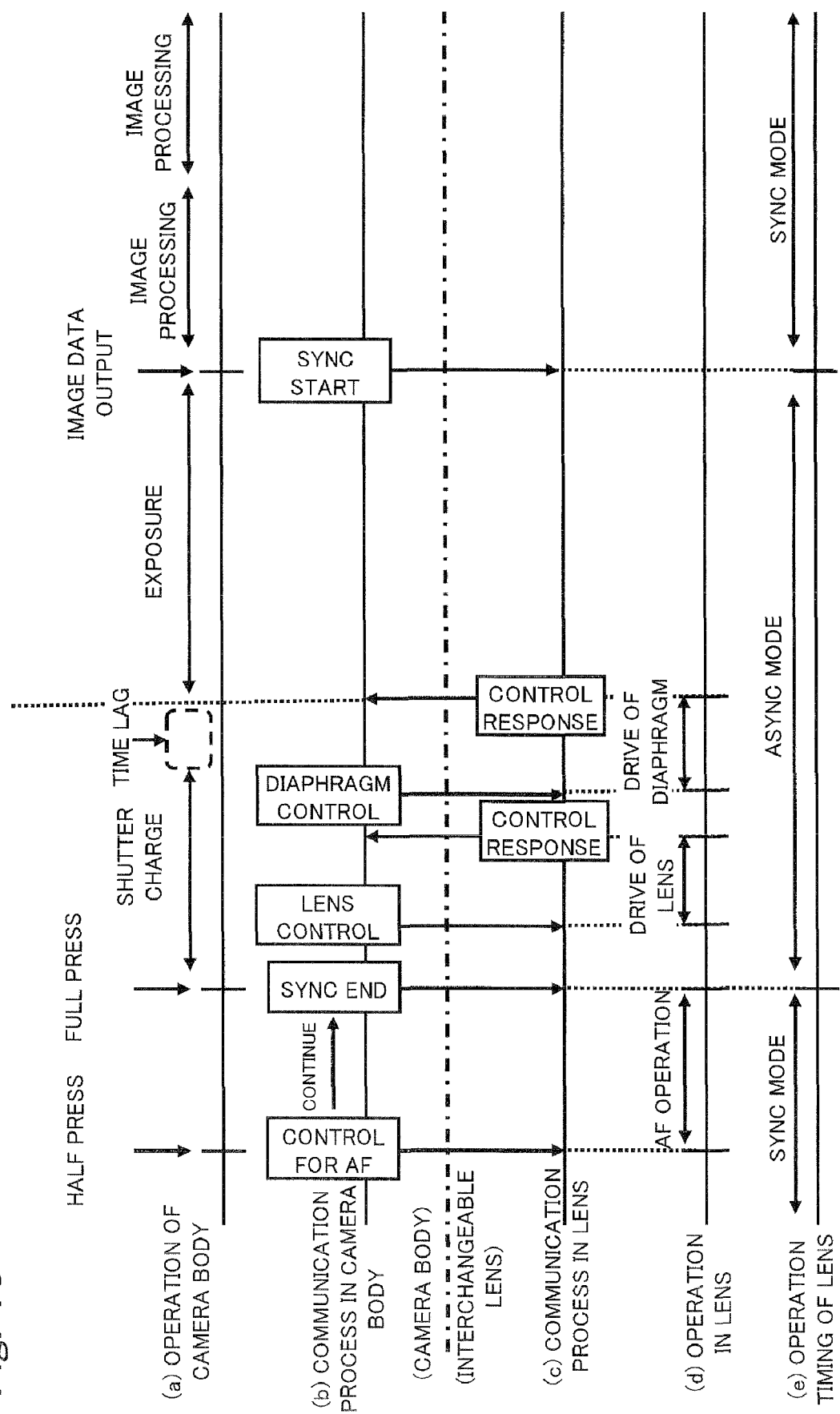

CAMERA BODY, INTERCHANGEABLE LENS, AND IMAGING APPARATUS

BACKGROUND

1. Technical Field

The technical field relates to an imaging apparatus including a camera body and an interchangeable lens, as well as a camera body and an interchangeable lens composing an imaging apparatus.

2. Related Art

There is an imaging apparatus including a camera body and an interchangeable lens mountable to the camera body (see, for example, JP-A-03-072308).

In the imaging apparatus described in JP-A-03-072308, the interchangeable lens is provided with a drive unit for driving a lens or a diaphragm according to an instruction from the camera body. In this configuration, the camera body can control the drive of a focus lens or the diaphragm by sending an instruction to the interchangeable lens.

Described below is the exchange of information between the camera body and the interchangeable lens in controlling by the camera body the drive of a member such as the focus lens in the interchangeable lens. In the following, the case where the camera body controls the drive of the focus lens and thereafter controls the drive of the diaphragm will be described as an example.

First, the camera body sends a control signal for driving the focus lens to the interchangeable lens. The interchangeable lens controls the drive unit to drive the focus lens based on the control signal. When the drive of the focus lens is completed, the interchangeable lens sends a signal indicating that the interchangeable lens is ready to accept next control to the camera body. When the camera body receives the signal indicating that the interchangeable lens is ready to accept next control, the camera body sends a control signal for driving the diaphragm to the interchangeable lens. Based on the control signal, the interchangeable lens controls the drive unit to drive the diaphragm. In this manner, the camera body can control the drive of the focus lens, and so on, in the interchangeable lens by sending control signals to the interchangeable lens.

When the focus lens and the diaphragm are separately driven, one of movable members (e.g., the focus lens) is driven and thereafter the other movable member (e.g., the diaphragm) is driven. Thus, there is a problem that it takes time to complete the drive of both the movable members. This problem will be specifically described with reference to FIG. 13.

First, when the camera body is instructed to start shooting by a user fully pressing a shutter switch, the camera body determines whether the focus lens and the diaphragm need to be driven. The case where the focus lens needs to be driven is, for example, a case where a focus position at exposure can be estimated based on the movement of a subject on a screen and the focus lens needs to be driven. The case where the diaphragm needs to be driven is, for example, a case where a diaphragm value at exposure (a diaphragm value different from that obtained upon full-press) has been set according to an operation by the user. When the camera body determines that both the focus lens and the diaphragm need to be driven, the camera body sends control signals to the interchangeable lens to drive the focus lens and the diaphragm.

When the camera body sends the interchangeable lens control signals to allow the interchangeable lens to perform operations one by one as described above, in the interchangeable lens, the focus lens is driven and thereafter the diaphragm is driven as shown in FIG. 13. It takes a long time to start exposure after the user fully presses the shutter switch, which is not desirable.

To avoid such inconvenience, it can be considered that the camera body may send two drive instructions (a focus lens drive instruction and a diaphragm drive instruction) in one piece of control information to the interchangeable lens. However, in data communication between the camera body and the interchangeable lens, the amount of data that can be communicated at one time is often limited. Hence, the camera body may not be able to send the interchangeable lens information for driving the diaphragm and information for driving the focus lens, as one instruction (control information). Accordingly, it is not effective to send two drive instructions to the interchangeable lens as one piece of control information.

SUMMARY

To solve the above problem, an imaging apparatus, and the like, that are capable of simultaneously driving a plurality of movable members (e.g., a focus lens and a diaphragm) in an interchangeable lens is provided.

In a first aspect of the present invention, an interchangeable lens mountable to a camera body is provided. The interchangeable lens includes a first movable member, a second movable member, a first drive unit configured to drive the first movable member, a second drive unit configured to drive the second movable member, an obtaining unit configured to obtain first control information and second control information from the camera body, the first control information being an instruction to control the first drive unit, the second control information being an instruction to control the second drive unit, a storage unit configured to store the second control information when the obtaining unit obtains the second control information, and a controller configured to control the first drive unit and the second drive unit based on the first and second control information obtained through the obtaining unit. When the obtaining unit obtains the first control information after obtaining the second control information, the controller drives the first drive unit and the second drive unit in parallel based on the obtained first control information and the stored second control information.

In a second aspect of the present invention, a camera body to which the above-described interchangeable lens is mountable. The camera body includes a sending unit configured to send first control information and second control information to the interchangeable lens.

In a third aspect of the present invention, an imaging apparatus including an interchangeable lens and a camera body to which the interchangeable lens is mounted is provided. The interchangeable lens includes: a first movable member, a second movable member, a first drive unit configured to drive the first movable member, a second drive unit configured to drive the second movable member, an obtaining unit configured to obtain first control information and second control information from the camera body, the first control information being an instruction to control the first drive unit, the second control information being an instruction to control the second drive unit, a storage unit configured to store the second control information when the obtaining unit obtains the second control information, and a controller configured to control the first drive unit and the second drive unit based on the first and second control information obtained through the obtaining unit. The camera body comprising a sending unit configured to send the first control information and the second control information to the interchangeable lens. The obtain unit obtains the first control information after obtaining the second control information, the controller of the interchangeable lens concurrently drives the first drive unit and the second drive unit based on the obtained first control information and the stored second control information.

According to the above aspects, one kind of control information (second control information) is provided as an instruction to control a drive unit for driving one movable member (second movable member) upon receiving another kind of control information (first control information) for driving another movable member (first movable member) after the one kind of control information (second control information) for driving the one movable member (second movable member) is received. In this configuration, even in a case where the camera body cannot send, to the interchangeable lens, the first control information for driving the first movable member and the second control information for driving the second movable member in one piece of control information (instruction), the interchangeable lens is able to simultaneously perform drive of the first movable member and drive of the second movable member, thereby enabling reduction of the time required to complete the drive of both the first movable member and the

BRIEF DESCRIPTION OF DRAWINGS

FIGS. 5A and 5B are diagrams each for describing an exemplary case where a focus lens needs to be driven.

FIGS. 6A and 6B are diagrams each for describing another exemplary case where the focus lens needs to be driven.

FIG. 13 is a diagram for describing a problem.

DETAIL DESCRIPTION OF THE PREFERRED EMBODIMENTS

Embodiments will be described below with reference to the accompanying drawings. In the following embodiments, a digital camera including an interchangeable lens and a camera body will be described as an example.

In the embodiments described below, reservation control information is provided to enable simultaneous drive of movable members (e.g., a focus lens and a diaphragm) in an interchangeable lens. The reservation control information is a command which specifies a condition for driving a predetermined movable member in the interchangeable lens and is sent from the camera body to the interchangeable lens. Even when the interchangeable lens receives reservation control information, the interchangeable lens does not immediately start the drive of the predetermined movable member specified by the reservation control information. When the interchangeable lens receives another predetermined control information after receiving the reservation control information, the interchangeable lens simultaneously (in parallel) drives the movable member specified by the reservation control information and another movable member specified by the other control information received after the reservation control information. Due to such provision of reservation control information, simultaneous drive of a plurality of movable members in the interchangeable lens can be achieved without expanding data size of control information. Note that, in the following description, a type of control information of which content is executed upon receipt of it by the interchangeable lens is referred to as "first control information". On the other hand, a type of control information, such as reservation control information, of which content is executed at a timing the interchangeable lens receives another control information after receiving the reservation control information is referred to as "second control information".

First Embodiment

1. Configuration
1-1. Overview of Overall Configuration

Figure 1:
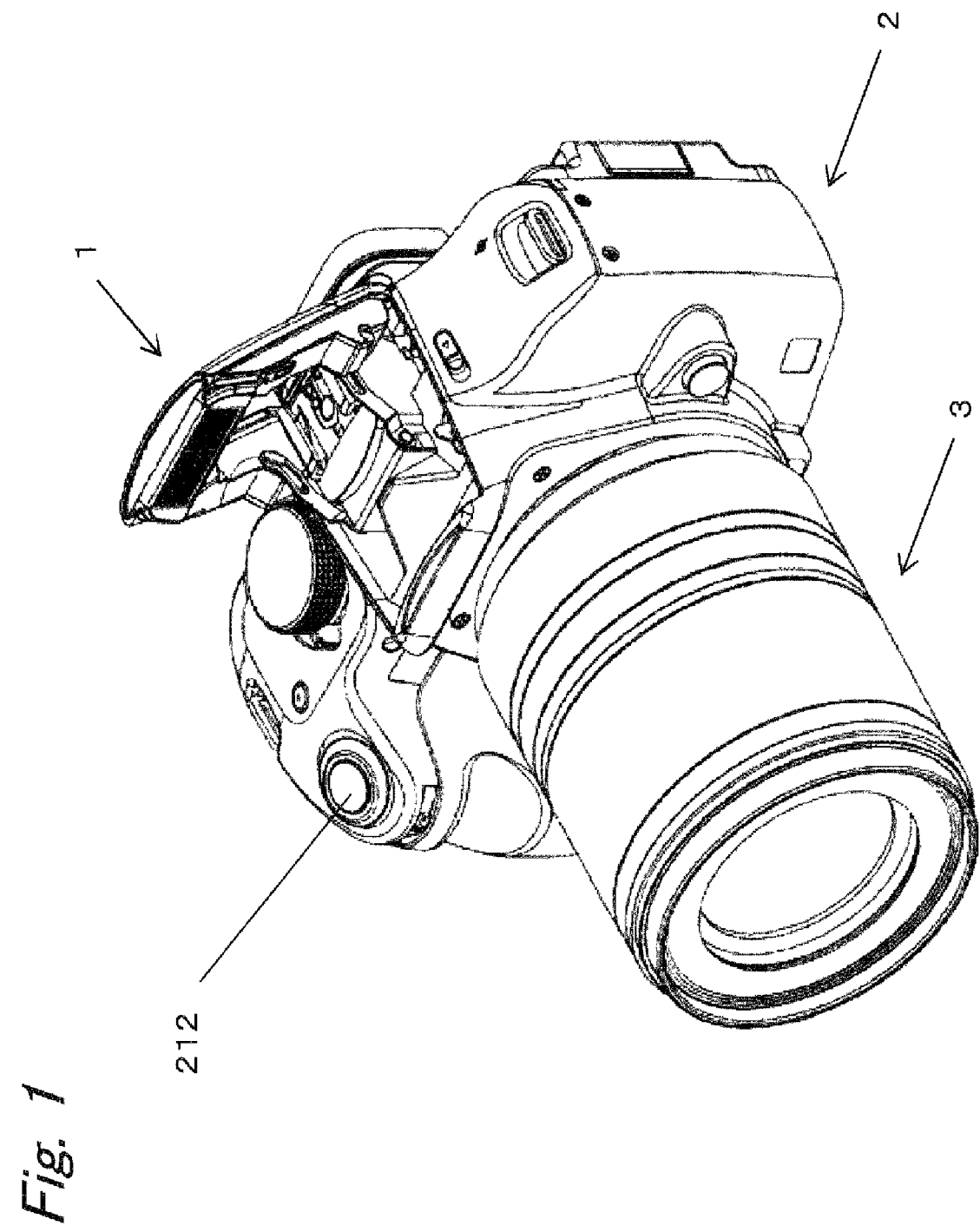
FIG. 1 is a perspective view of a digital camera according to First Embodiment.
Figure 2:
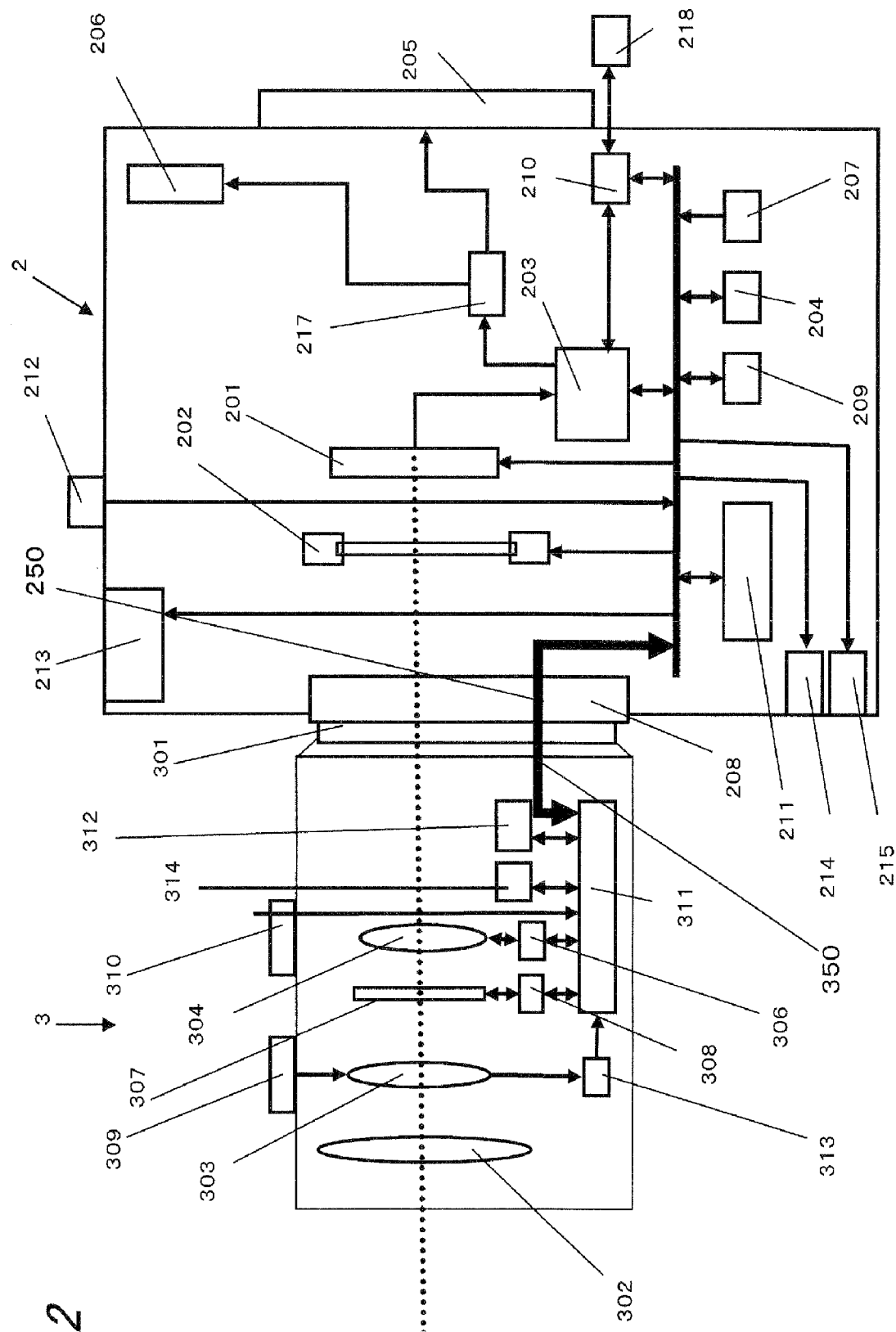
FIG. 2 is a diagram showing an exemplary configuration of the digital camera according to First Embodiment.

FIG. 1 is a perspective view of a digital camera 1 according to one embodiment. FIG. 2 is a configuration diagram of the digital camera 1 according to the present embodiment.

As shown in FIG. 1, the digital camera 1 according to the present embodiment includes a camera body 2 and an interchangeable lens 3 mountable to the camera body 2.

As shown in FIG. 2, the camera body 2 includes a CMOS sensor 201, a shutter 202, a signal processing processor (DSP) 203, a buffer memory 204, a liquid crystal monitor 205, an electronic viewfinder (EVF) 206, a power supply 207, a body mount 208, a flash memory 209, a card slot 210, a CPU 211, a shutter switch 212, an electronic flash 213, a microphone 214, and a speaker 215.

The interchangeable lens 3 includes a lens mount 301, a lens system having a zoom lens 303 and a focus lens 304, a focus driver 306 that drives the focus lens 304, a diaphragm 307, an diaphragm driver 308 that drives the diaphragm 307, a zoom ring 309, a focus ring 310, a lens controller 311, a buffer memory 312, and a flash memory 314.

1-2. Configuration of Camera Body

The camera body 2 is configured to be able to capture a subject image formed from collected light by the lens system of the interchangeable lens 3 to record data on the captured image in a storage medium such as a memory card.

The CMOS sensor 201 includes a light-receiving element, an AGC (gain control amplifier), and an AD converter. The light-receiving element converts an optical signal formed from collected light by the lens system into an electrical signal to generate image data. The AGC amplifies the electrical signal outputted from the CMOS sensor 201. The AD converter converts the electrical signal outputted from the CMOS sensor 201 into a digital signal. Note that the CMOS sensor 201 performs various operations such as exposure, transfer, and an electronic shutter operation, based on control signals received from the CPU 211. These various operations can be implemented using a timing generator, and so on.

The mechanical shutter 202 switches between cut-off and passage of an optical signal incident on the CMOS sensor 201 through the lens system. The mechanical shutter 202 is driven by a mechanical shutter driver. The mechanical shutter driver is configured by mechanical components such as a motor and a spring, and drives the mechanical shutter 202 under the control of the CPU 211. In short, the mechanical shutter 202 opens and closes to temporally regulate the amount of light incident on the CMOS sensor 201.

The signal processing processor 203 (DSP) performs predetermined image processing on image data which is converted into a digital signal by the AD converter. The predetermined image processing includes gamma conversion, YC conversion, an electronic zoom process, a compression process, a decompression process, and so on, but not limited to these.

The buffer memory 204 serves as a work memory when the signal processing processor 203 performs a process and when the CPU 211 performs a control process. The buffer memory 204 can be implemented by, for example, a DRAM.

The liquid crystal monitor 205 is disposed on the back of the camera body 2 and can display image data generated by the CMOS sensor 201 or image data obtained by performing a predetermined process on the image data. An image signal to be inputted to the liquid crystal monitor 205 is converted from a digital signal into an analog signal by a DA converter when outputted from the signal processing processor 203 to the liquid crystal monitor 205.

The electronic viewfinder 206 is disposed in the camera body 2 and can display image data generated by the CMOS sensor 201 or image data obtained by performing a predetermined process on the image data. An image signal to be inputted to the electronic viewfinder 206 is also similarly converted from a digital signal into an analog signal by the DA converter when outputted from the signal processing processor 203 to the electronic viewfinder 206.

Display is switched by a display switching unit 217 to be performed on either one of the liquid crystal monitor 205 and the electronic viewfinder 206. Specifically, while an image is displayed on the liquid crystal monitor 205, nothing is displayed in the electronic viewfinder 206. While an image is displayed in the electronic viewfinder 206, nothing is displayed on the liquid crystal monitor 205. The display switching unit 217 can be implemented by a physical structure such as a selection switch. For example, when the signal processing processor 203 and the liquid crystal monitor 205 are electrically connected, the selection switch is switched so that the electrical connection between the signal processing processor 203 and the liquid crystal monitor 205 is disconnected and the signal processing processor 203 and the electronic viewfinder 206 are electrically connected. Note that switching is not limited to that described above and the display switching unit 217 may switch display between the liquid crystal monitor 205 and the electronic viewfinder 206 based on a control signal from the CPU 211, and so on.

As described above, it is configured to switch display between the liquid crystal monitor 205 and the electronic viewfinder 206. Note, however, that this is a problem arising from configurational limitations and thus display on the liquid crystal monitor 205 and display in the electronic viewfinder 206 may be simultaneously performed. In the case of simultaneous display, an image displayed on the liquid crystal monitor 205 and an image displayed in the electronic viewfinder 206 may be same or different.

The power supply 207 supplies power to be consumed by the digital camera 1. The power supply 207 may be, for example, a dry battery or rechargeable battery. Alternatively, the power supply 207 may supply power which is provided from an external power source through a cord, to the digital camera 1.

The body mount 208 cooperating with the lens mount 301 of the interchangeable lens 3 is a member enabling attachment and detachment of the interchangeable lens 3. The body mount 208 can be electrically connected to the interchangeable lens 3 with connection terminals, and so on, and can also be mechanically connected to the interchangeable lens 3 with a mechanical member such as an engaging member. The body mount 208 can feed a signal from the lens controller 311 in the interchangeable lens 3 to the CPU 211 and feed a signal from the CPU 211 to the lens controller 311 of the interchangeable lens 3. That is, the CPU 211 can send and receive control signals, information on the lens system, and so on to/from the lens controller 311 of the interchangeable lens 3. Note that control information, and so on to be sent and received between the CPU 211 and the lens controller 311 are transmitted through a camera transmission path 250 provided in the camera body 2 and a lens transmission path 350 provided in the interchangeable lens 3.

The flash memory 209 is a storage medium used as a built-in memory. The flash memory 209 can store image data or image data processed in a predetermined process. The flash memory 209 can also store digitized audio signals. Further, the flash memory 209 can store programs, setting values, and so on for control by the CPU 211.

The card slot 210 is a slot for allowing a memory card 218 to be inserted therein or removed therefrom. The memory card 218 can store image data or image data processed in a predetermined process. The memory card 218 can also store digitized audio signals. In short, the memory card 218 is a storage medium.

The CPU 211 controls the entire camera body 2. The CPU 211 may be implemented by a microcomputer or a hard-wired circuit. The CPU 211 performs various controls. The various controls done by the CPU 211 are described in Section 2-1.

The shutter switch 212 is a button provided on the topside of the camera body 2 and is an operation unit for detecting half-press and full-press operations performed by the user. When accepting a half-press operation by the user, the shutter switch 212 outputs a half-press signal to the CPU 211. On the other hand, when accepting a full-press operation by the user, the shutter switch 212 outputs a full-press signal to the CPU 211. The CPU 211 performs various controls based on these signals. Note that in the present embodiment the full-press signal is a shooting start signal.

The electronic flash 213 irradiates light to a subject based on a control signal from the CPU 211. For example, the electronic flash 213 can be implemented using a xenon lamp, a capacitor, and so on. In the case of this configuration, the electronic flash 213 irradiates light by accumulating high-voltage charge in the capacitor and applying the charge to an electrode of the xenon lamp.

The microphone 214 converts sound into an electrical signal. The electrical signal outputted from the microphone 214 is converted into a digital signal by the AD converter. The digital signal converted by the AD converter is stored in the flash memory 209 or the memory card 218 under control of the CPU 211.

The speaker 215 converts an electrical signal into sound. An electrical signal to be inputted to the speaker 215 is a signal converted from a digital signal into an electrical signal by the DA converter. The DA converter is supplied with the digital signal read from the flash memory 209 or the memory card 218 under control of the CPU 211.

1-3. Configuration of Interchangeable Lens

The lens system includes the zoom lens 303, the focus lens 304, and an objective lens 302, collecting light from a subject. The zoom lens 303 is driven by the zoom ring 309 to adjust the zoom magnification. The focus lens 304 is driven by the focus driver 306 or the focus ring 310 to adjust the focus. As such, the focus lens 304 and the zoom lens 303 are movable members. Note that the focus lens 304 is an example of a second movable member.

The focus driver 306 is configured to drive the focus lens 304 based on a control signal from the lens controller 311. The focus driver 306 is configured by a motor, a driver, and so on. The focus driver 306 is an example of the second drive unit.

The diaphragm 307 regulates the amount of light passing through the lens system. Regulation of light can be performed by, for example, increasing or decreasing an aperture formed by five blades, and so on. The diaphragm 307 is an example of a first movable member.

The diaphragm driver 308 changes the size of the aperture of the diaphragm 307. The diaphragm driver 308 is configured by a motor, a driver, and so on. In First Embodiment, the size of the aperture of the diaphragm 307 is changed based on a control signal from the lens controller 311. The size of the aperture can be specified by F-number. The diaphragm driver 308 is an example of the first drive unit.

The zoom ring 309 is provided on the exterior of the interchangeable lens 3 and drives the zoom lens 303 according to an operation performed by the user. The focus ring 310 is provided on the exterior of the interchangeable lens 3 and drives the focus lens 304 according to an operation performed by the user. The zoom ring 309 drives the zoom lens 303 mechanically when rotated by the user's operation. Note that the zoom ring 309 may be configured to electrically drive the zoom lens 303.

The lens controller 311 controls the entire interchangeable lens 3. The lens controller 311 may be implemented by a microcomputer or a hard-wired circuit. The lens controller 311 performs various controls. The various controls by the lens controller 311 are described in Section 2-2.

The buffer memory 312 serves as a work memory when the lens controller 311 performs a control process. The buffer memory 312 can be implemented by, for example, a DRAM.

The flash memory 314 is electrically connected to the lens controller 311. The flash memory 314 can store control programs, parameters, and so on.

2. Control of Camera Body and Interchangeable Lens

2-1. Control by CPU in Camera Body

The CPU 211 can send diaphragm control information (first control information) for driving the diaphragm 307 and reservation lens control information (second control information) as reservation control information. The CPU 211 is an example of the sending unit.

The diaphragm control information includes information on a target aperture of the diaphragm 307, as information for controlling the diaphragm driver 308.

The reservation lens control information is control information for driving the focus lens 304 when the interchangeable lens 3 receives diaphragm control information after receiving reservation lens control information. The reservation lens control information includes information on a position of the focus lens 304 (an absolute position or relative position) which is a control target, as information for controlling the focus driver 306 upon receipt of the diaphragm control information.

Note that the diaphragm control information and the reservation lens control information are different types of control information. The diaphragm control information is information by which the diaphragm driver 308 is controlled immediately after the interchangeable lens 3 obtains the diaphragm control information. On the other hand, the reservation lens control information is information by which the focus driver 306 is not controlled until the interchangeable lens 3 obtains the diaphragm control information, even when the interchangeable lens 3 has obtained the reservation lens control information.

Using such reservation lens control information, the interchangeable lens 3 is able to simultaneously (in parallel) drive the focus lens 304 and the diaphragm 307. That is, the lens controller 311 can control the focus driver 306 and the diaphragm driver 308 in parallel.

Note that the camera body 2 can also send, to the interchangeable lens 3, the control information (first control information) for immediately driving the focus lens 304 when the interchangeable lens 3 receives the control information.

2-1-1. Switchover of Synchronization and Asynchronization on Camera Body and Interchangeable Lens Synchronization between the camera body 2 and the interchangeable lens 3 will be described. In the present embodiment, the camera body 2 and the interchangeable lens 3 are configured to achieve synchronization between the drive of the CMOS sensor 201 in the camera body 2 and the drive of the focus lens 304 or the diaphragm 307 in the interchangeable lens 3. To start the synchronization between the camera body 2 and the interchangeable lens 3, the CPU 211 sends a signal for starting the synchronization to the lens controller 311. To end the synchronization between the camera body 2 and the interchangeable lens 3, the CPU 211 sends a signal for ending the synchronization to the lens controller 311. In this manner, the interchangeable lens 3 can achieve synchronization with the camera body 2.

Figure 3:
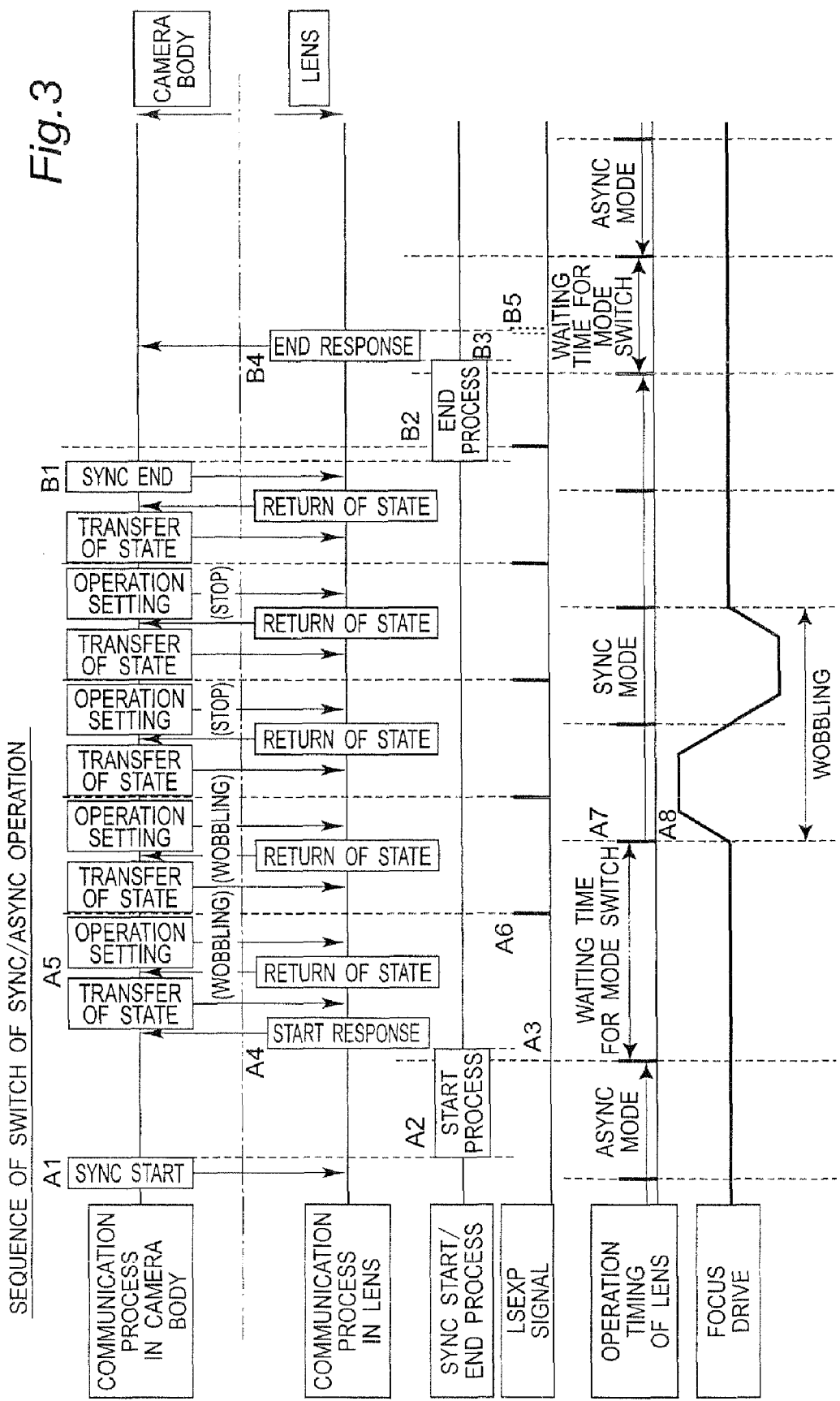
FIG. 3 is a diagram for describing switchover between synchronization and asynchronization on a camera body and an interchangeable lens according to First Embodiment.

Referring to FIG. 3, switching control between synchronous and asynchronous operations on the interchangeable lens 3 will be described. For ease of description, the following description is made taking the CPU 211 as the camera body 2 and the lens controller 311 as the interchangeable lens 3.

First, an operation for starting synchronous operation will be described. The camera body 2 sends a synchronization start command to the interchangeable lens 3 (A1 in FIG. 3). The interchangeable lens 3 performs a synchronization start process (A2 in FIG. 3). The synchronization start process includes a process of providing notification to each unit to change the drive frequency of the lens controller 311 from 30 Hz to 60 Hz. This process is performed because the drive frequency of the lens controller 311 set at asynchronous operation differs from that set at synchronous operation. Specifically, the synchronization start process includes a process of providing notification to each unit to complete residual processes that need to be driven in asynchronous operation, a process of providing notification to each unit to prepare for handling a new frequency, and so on. When the interchangeable lens 3 detects that such notification has been provided to each unit, the interchangeable lens 3 gets out of an asynchronous state (self-running mode) (A3 in FIG. 3). Thereafter, the interchangeable lens 3 goes into a state of waiting for switchover of mode. The state of waiting for switchover of mode is provided because each unit of the interchangeable lens 3 is performing a process for completing the residual processes and a process for preparing for handling a new frequency (changed frequency). Note that when the interchangeable lens 3 gets out of the asynchronous state, the interchangeable lens 3 sends a start command response to the camera body 2 (A4 in FIG. 3). When receiving the start command response, the camera body 2 starts communication performed at synchronous operation (A5 in FIG. 3). Specifically, the camera body 2 sends, to the interchangeable lens 3, an operation setting command for causing the interchangeable lens 3 to operate in synchronization. After sending the operation setting command, the camera body 2 sends a synchronizing signal (A6 in FIG. 3). The interchangeable lens 3 starts a synchronous operation after a lapse of a predetermined delay time (A7 in FIG. 3). At this time, the interchangeable lens 3 performs focus drive (e.g., wobbling) instructed with the operation setting commend from the camera body 2 (A8 in FIG. 3).

Next, an operation for ending the synchronization will be described. The camera body 2 sends a synchronization end command to the interchangeable lens 3 (B1 in FIG. 3). The interchangeable lens 3 performs a synchronization end process (B2 in FIG. 3). The synchronization end process includes a process of adjusting the drive frequency of the lens controller 311 from 60 Hz to 30 Hz. The synchronization end process involves the same operation as that performed in the above-described synchronization start process. When confirming completion of the synchronization end process, the interchangeable lens 3 gets out of a synchronous state (B3 in FIG. 3). The interchangeable lens 3 sends an end command response to the camera body 2 (B4 in FIG. 3). The camera body 2 stops the output of the synchronizing signal (B5 in FIG. 3). The interchangeable lens 3 goes into an asynchronous state (self-running mode).

In the above-described manner, synchronous and asynchronous operations are switched on the camera body 2 and the interchangeable lens 3.

2-1-2. Data Amount Capable of Being Communicated at One Time at Synchronous Operation and Asynchronous Operation In the digital camera 1, there is a limit on the data amount of control information sent at one time between the camera body 2 and the interchangeable lens 3. That is, the camera body 2 can only send, for example, a predetermined data amount of control information at one time. Note that signals (e.g., a signal indicating the state of the camera body 2) other than a control signal are not data of control information and thus can be simultaneously sent together with the control information, regardless of the limitation of data amount of the control information. in the present embodiment, the data amount of control information that can he communicated at one time at asynchronous operation is defined to be 4 bytes and the data amount of control information that can be communicated at one time at synchronous operation is defined to be 32 bytes.

Note that the diaphragm control information and reservation lens control information according to the present embodiment are configured by 4 bytes, and the reservation lens control information for controlling the focus lens 304 when the interchangeable lens 3 obtains the diaphragm control information is configured by 4 bytes. That is, at asynchronous operation, the camera body 2 cannot send the diaphragm control information and lens control information in one piece of control information to the interchangeable lens 3. Note that these pieces of control information are not limited to 4 bytes. Note also that the data amount of control information that can be communicated at asynchronous operation is similarly not limited to the above-described example.

2-2. Control by Lens Controller

The lens controller 311 obtains diaphragm control information and reservation lens control information. When the lens controller 311 obtains diaphragm control information after obtaining reservation lens control information, the lens controller 311 controls the focus driver 306 and the diaphragm driver 308 in parallel based on the reservation lens control information and the diaphragm control information.

The term "control in parallel" means a concept including that the focus driver 306 and the diaphragm driver 308 are driven simultaneously. However, not only that, it also includes that the focus driver 306 and the diaphragm driver 308 are alternately driven. For example, when the focus driver 306 and the diaphragm driver 308 are controlled in parallel, the control can be performed as follows. The lens controller 311 sends a control signal to the focus driver 306 and thereafter sends a control signal to the diaphragm driver 308. Accordingly, while the focus driver 306 drives the focus lens 304, the diaphragm driver 308 concurrently drives the diaphragm 307. For the other control, first, the lens controller 311 sends control information which is a part of the obtained reservation lens control information to the focus driver 306. The focus driver 306 drives the focus lens 304 based on the part of control information. Also, the lens controller 311 sends the control information which is a part of the obtained diaphragm control information to the diaphragm driver 308. The diaphragm driver 308 drives the diaphragm 307 based on the part of control information. The lens controller 311 repeats these processes until the control based on the obtained control information ends. Then, the focus lens 304 and the diaphragm 307 can be alternately driven while being successively switched.

In this way, the interchangeable lens 3 can drive the focus lens 304 and the diaphragm 307 in parallel. Note that the lens controller 311 is an example of the obtaining unit and an example of a controller.

When the lens controller 311 obtains reservation lens control information from the camera body 2, the lens controller 311 stores the obtained reservation lens control information in the buffer memory 312. Note that the lens controller 311 is an example of a storage unit and the buffer memory 312 is an example of a storage medium.

3. Operations

Figure 4:
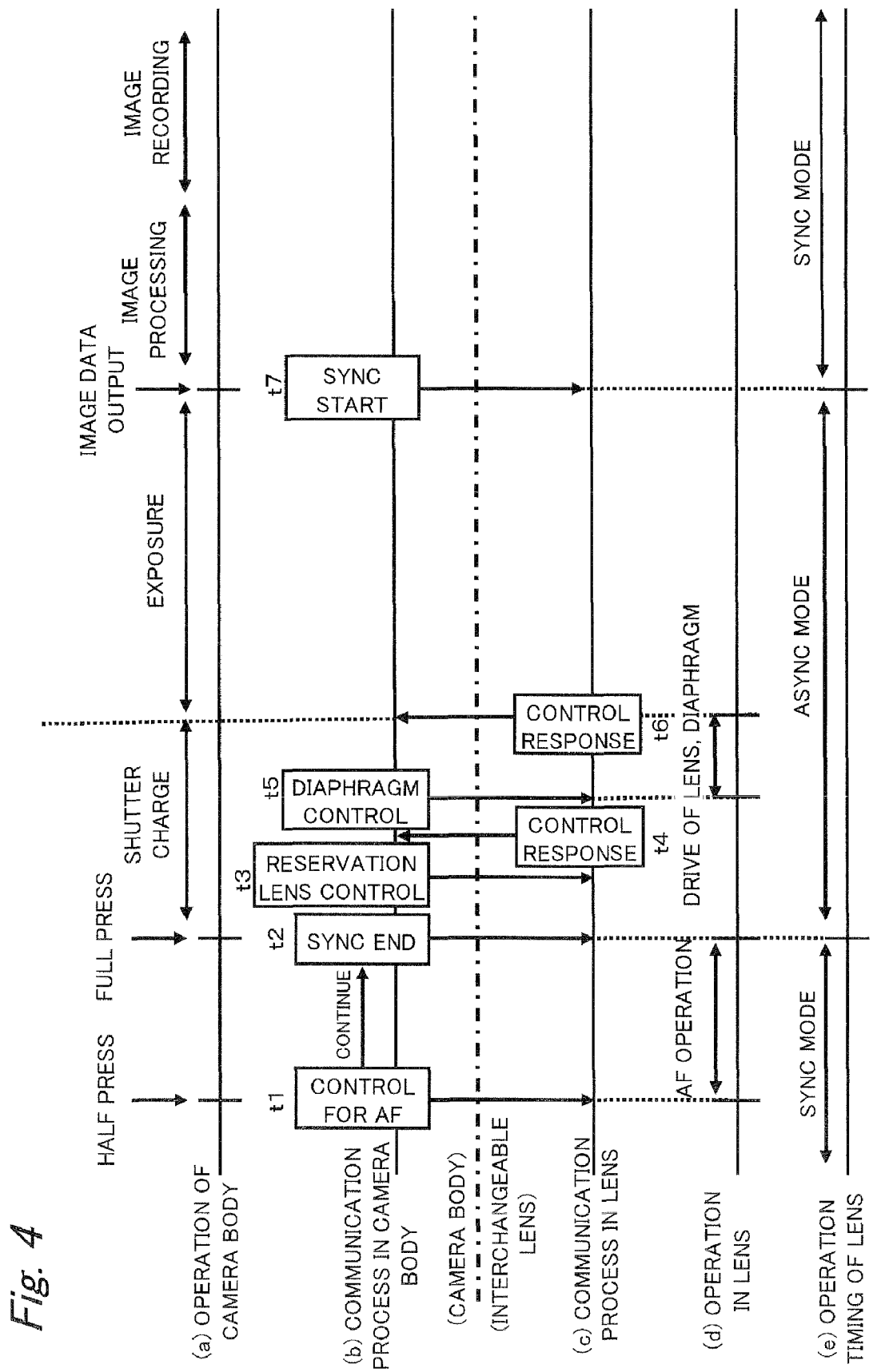
FIG. 4 is a timing chart for describing an exemplary operation of the digital camera according to First Embodiment.

An exemplary operation of the digital camera 1 configured in the above-described manner will be described using a timing chart in FIG. 4. Note that the interchangeable lens 3 is in synchronization with the camera body 2.

When the camera body 2 accepts half-press of the shutter switch 212, the CPU 211 sends the interchangeable lens 3 a control signal for an automatic focus (hereinafter, referred to as "AF") operation (t1). Thereafter, each of the camera body 2 and the interchangeable lens 3 performs a predetermined operation required for an AF operation to adjust a focus state of a subject image to be formed on the CMOS sensor 201 (t1 to t2). When the camera body 2 accepts full-press of the shutter switch 212 during an AF operation or after the completion of an AF operation, the CPU 212 sends the interchangeable lens 3 a signal for ending the synchronization (t2). When the interchangeable lens 3 receives the signal for ending the synchronization, the interchangeable lens 3 switches the state from "synchronous" to "asynchronous" (t2).

Described below is an exemplary case where the focus lens 304 and the diaphragm 307 need to be driven after full-press of the shutter switch 212 is accepted and until exposure of the CMOS sensor 201 starts.

The cases where the focus lens 304 needs to be driven during such a period include, for example, the following two cases. The first case is that, as shown in FIGS. 5A and 5B, the shutter switch 212 accepts full-press during an AF operation and a focus position of the focus lens 304 has already been detected. The second case is that, as shown in FIGS. 6A and 6B, an AF operation is performed on a moving subject and a focus position of the focus lens 304 can be guessed by estimating movement of the subject based on track of the drive of the focus lens 304 which follows the movement of the subject.

The case where the diaphragm 307 needs to be driven during the above-described period is, for example, a case that the diaphragm 307 is driven to control an exposure state for shooting based on a metering result of image data captured upon half-press.

Referring back to FIG. 4, when the focus lens 304 and the diaphragm 307 need to be driven, the camera body 2 sends a reservation lens control information to the interchangeable lens 3 (t3). The reservation lens control information is sent to the interchangeable lens 3 from the camera body 2 during a period after the shutter switch 212 is fully pressed (an imaging start signal is outputted) and until exposure of the CMOS sensor 201 starts. When the interchangeable lens 3 receives the reservation lens control information, the interchangeable lens 3 stores the received reservation lens control information in the buffer memory 312. The interchangeable lens 3 then sends the camera body 2 a control response for informing the camera body 2 that the interchangeable lens 3 has received the control information from the camera body 2 (t4). The control response is also information indicating that the interchangeable lens 3 can accept the next control from the camera body 2.

When the camera body 2 receives the control response, the camera body 2 sends diaphragm control information to the interchangeable lens 3 (t5). When the interchangeable lens 3 receives the diaphragm control information, the interchangeable lens 3 controls the focus driver 306 and the diaphragm driver 308 based on the reservation lens control information stored in the buffer memory 312 and the received diaphragm control information. When the drive of the focus lens 304 and the diaphragm 307 by the focus driver 306 and the diaphragm driver 308 is completed, the interchangeable lens 3 sends a control response to the camera body 2 (t6). The control response also serves as a control completion notification.

Upon receiving the control response, the camera body 2 detects that drive control by the focus driver 306 and the diaphragm driver 308 has been completed, and thus controls the CMOS sensor 201 and the shutter 202 to start exposure. Then, after completion of the exposure, in the camera body 2, image data is outputted from the CMCS sensor 201. At that time, the camera body 2 sends a synchronization start signal to the interchangeable lens (t7).

As described above, the camera body 2 sends reservation lens control information and diaphragm control information to the interchangeable lens 3 at different timings. The interchangeable lens 3 can drive the focus lens 304 and the diaphragm 307 in parallel based on these pieces of control information.

Figure 7:
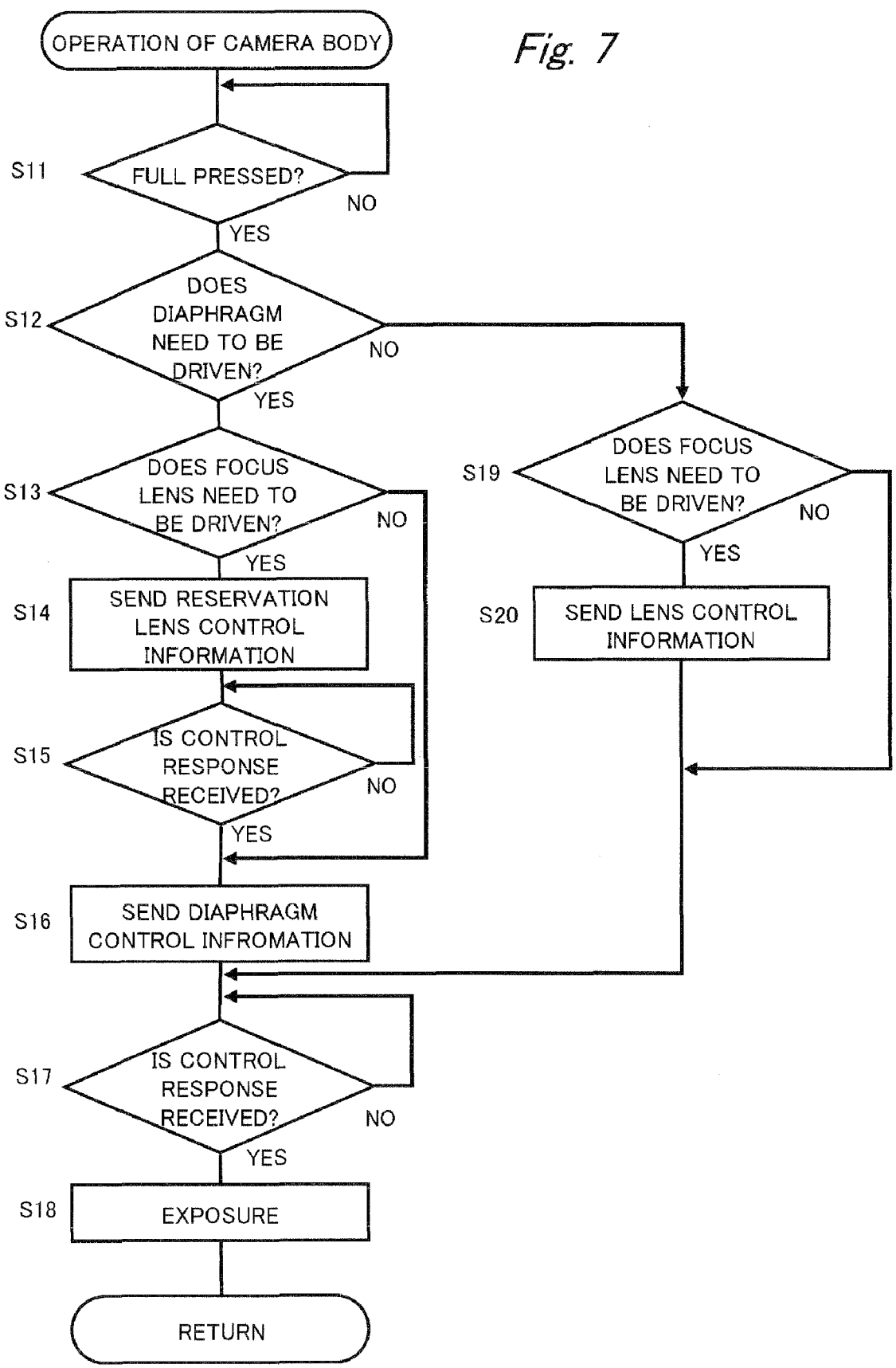
FIG. 7 is a flowchart for describing an exemplary operation of the camera body according to First Embodiment.
Figure 8:
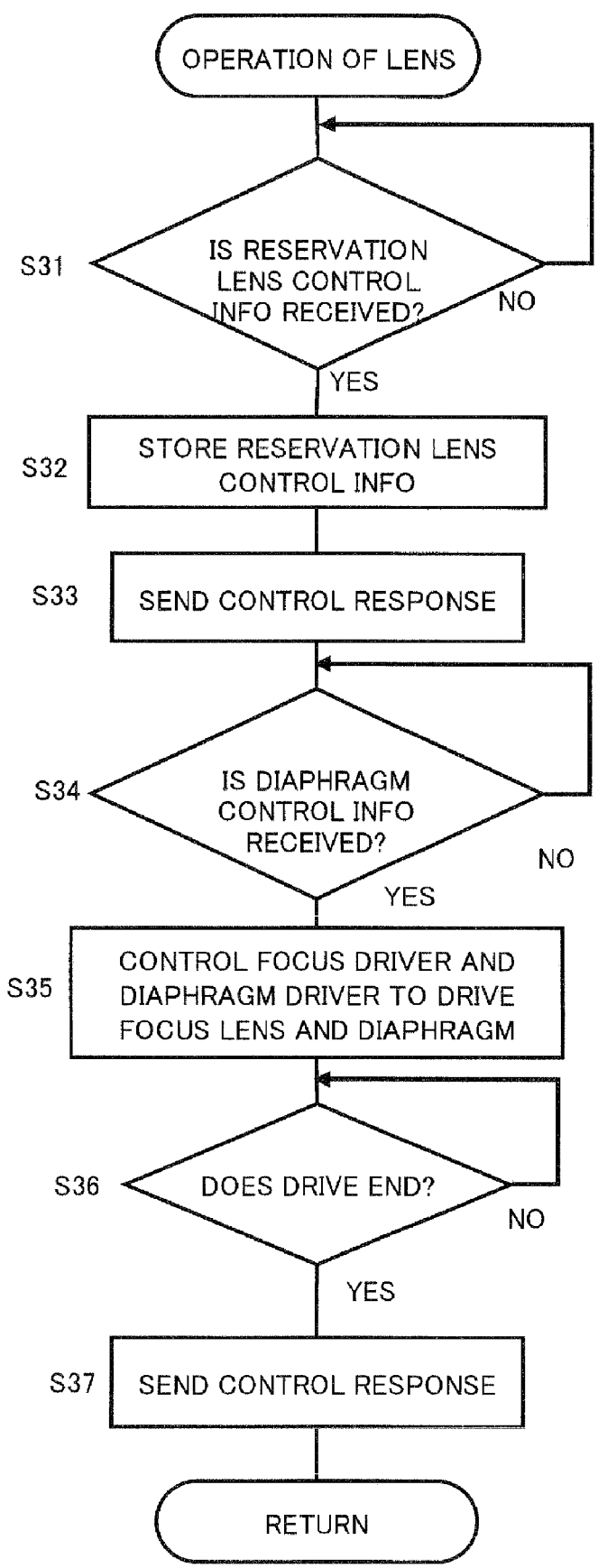
FIG. 8 is a flowchart for describing an exemplary operation of the interchangeable lens according to First Embodiment.

The operations of the camera body 2 and the interchangeable lens 3 that implement the above-described operation will be more specifically described using flowcharts in FIGS. 7 and 8.

The operation of the camera body 2 will be described with reference to FIG. 7. In the following, operations performed at time t2 and later in FIG. 4 will be described. When the CPU 211 receives full-press on the shutter switch 212 (S11), the CPU 211 determines whether the diaphragm 307 needs to be driven (S12).

If the CPU 211 determines that the diaphragm 307 needs to be driven, then the CPU 211 further determines whether the focus lens 304 needs to be driven (S13). If the CPU 211 determines that the focus lens 304 needs to be driven, then the CPU 211 sends reservation lens control information to the interchangeable lens 3 (S14). Thereafter, the CPU 211 waits for a control response from the interchangeable lens 3 (S15). If the CPU 211 receives the control response, then the CPU 211 proceeds to step S16. On the other hand, if the CPU 211 determines that the focus lens 304 does not need to be driven in step S13, then the CPU 211 proceeds to step S16. In step S16, the CPU 211 sends diaphragm control information to the interchangeable lens 3. Thereafter, the CPU 211 proceeds to step S19.

On the other hand, if the CPU 211 determines that the diaphragm 307 does not need to be driven in step S12, then the CPU 211 determines whether the focus lens 304 needs to be driven (S13). If the CPU 211 determines that the focus lens 304 needs to be driven, then the CPU 211 sends reservation lens control information (S20). If the CPU 211 sends reservation lens control information or determines that the focus lens 304 does not need to be driven, then the CPU 211 moves to step S17.

In step S17, the CPU 211 waits until it receives a control response from the interchangeable lens 3. If the CPU 211 receives a control response, then the CPU 211 controls the CMOS sensor 201 and the shutter 202 to perform exposure (capturing of a subject image) (S18).

The operation of the interchangeable lens 3 will be described with reference to FIG. 8. As with the above, operations performed at time t2 and later in FIG. 4 will be described. The lens controller 311 waits until it receives reservation lens control information (S31). If the lens controller 311 receives reservation lens control information, then the lens controller 311 stores the reservation lens control information in the buffer memory 312 (S32). Thereafter, the lens controller 311 sends a control response to the camera body 2 (S33). The lens controller 311 waits until it receives diaphragm control information (S34). If the lens controller 311 receives diaphragm control information, then the lens controller 311 controls the focus driver 306 and the diaphragm driver 308 to simultaneously drive the focus lens 304 and the diaphragm 307 (S35). Thereafter, if the lens controller 311 detects that the drive of the focus lens 304 and the diaphragm 307 by the focus driver 306 and the diaphragm driver 308 is completed (S36), then the lens controller 311 sends a control response to the camera body 2 (S37). The completion of the drive by the focus driver 306 and the diaphragm driver 308 can be determined based on drive completion signals outputted from the focus driver 306 and the diaphragm driver 308. Note that the focus driver 306 and the diaphragm driver 308 are configured to be able to send a drive completion signal for informing of completion of drive to the lens controller 311.

4. Conclusions

First Embodiment describes the digital camera 1 including the interchangeable lens 3 and the camera body 2 to which the interchangeable lens 3 can be mounted. The interchangeable lens 3 includes the diaphragm driver 308 that drives the diaphragm 307; the focus driver 306 that drives the focus lens 304; and the lens controller 311 that obtains, from the camera body 2, diaphragm control information for controlling the diaphragm driver 308 and reservation lens control information for controlling the focus driver 306 when the diaphragm control information is obtained, wherein when obtaining reservation lens control information, the lens controller 311 stores the reservation lens control information in the buffer memory 312; and when obtaining diaphragm control information after obtaining the reservation lens control information, the lens controller 311 controls the focus driver 306 and the diaphragm driver 308 in parallel based on the obtained diaphragm control information and the stored reservation lens control information. On the other hand, the camera body 2 includes the CPU 211 that sends diaphragm control information and reservation lens control information. The CPU 211 has a period during which the CPU 211 cannot send diaphragm control information and reservation lens control information as one piece of control information due to constraints of communication on sending control information to the interchangeable lens 3.

Using such reservation lens control information allows two movable members such as the focus lens and the diaphragm to be simultaneously driven without increasing amount of information on a command (control information). That is, even when the camera body cannot send, as one piece of control information, diaphragm control information for driving the diaphragm and lens control information for driving the focus lens to the interchangeable lens, the interchangeable lens is able to perform drive of the diaphragm and drive of the focus lens in parallel.

Second Embodiment

Although First Embodiment describes an example in which the focus lens 304 and the diaphragm 307 are simultaneously driven, there may be a case where when a predetermined condition is satisfied, it is desirable not to simultaneously drive the focus lens 304 and the diaphragm 307 even if reservation lens control information is received. For example, it is desirable to drive only one of the focus lens 304 and the diaphragm 307, when simultaneous drive of the focus lens 304 and the diaphragm 307 increases the power to be consumed, when the drive of the focus lens 304 and the drive of the diaphragm 307 interfere with each other, or when the processing load of the lens controller 311 increases. The present embodiment describes an example in which, when such a condition is satisfied, control is performed to drive only one of the focus lens 304 and the diaphragm 307.

Figure 9:
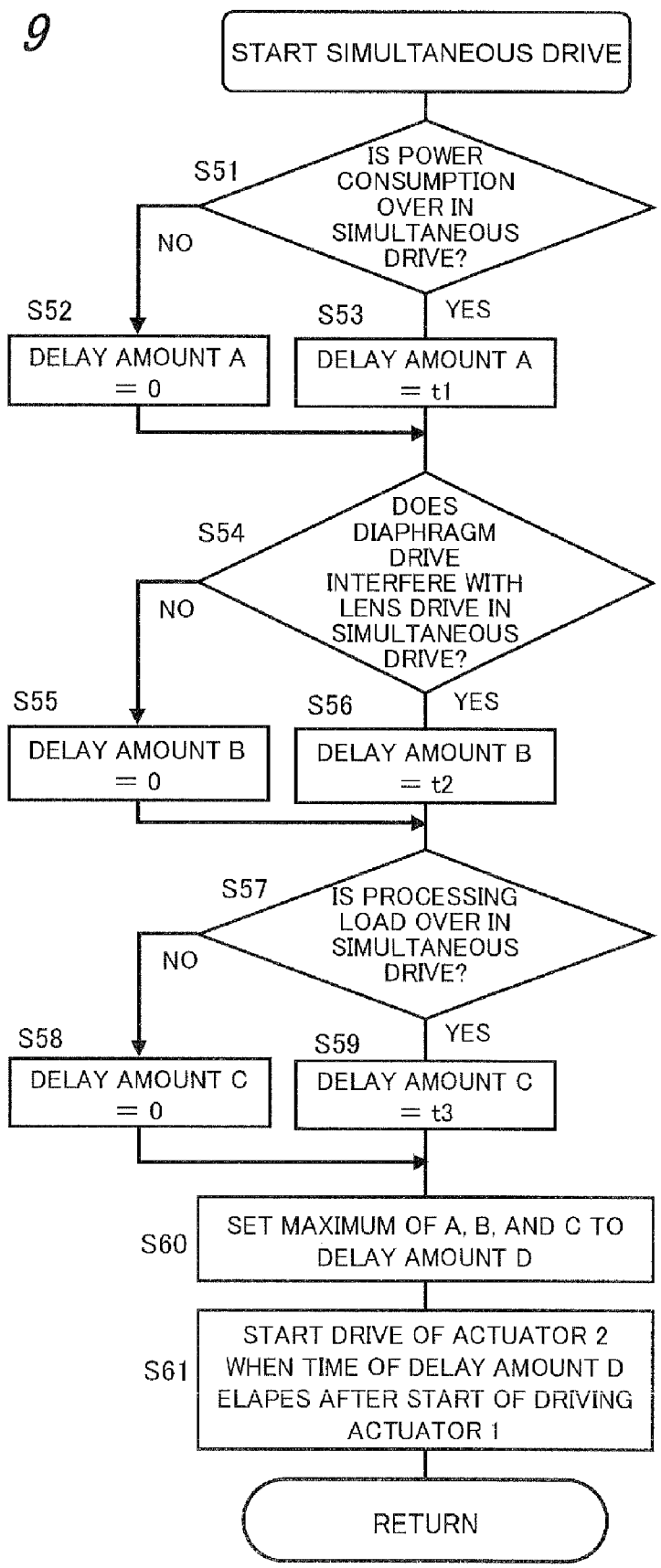
FIG. 9 is a flowchart for describing an exemplary operation of setting an amount of delay for drive start timings of the focus lens and a diaphragm according to Second Embodiment.

Referring to a flowchart in FIG. 9, the lens controller 311 determines whether power consumption for driving the focus lens 304 based on the reservation lens control information and driving simultaneously the diaphragm 307 according to the diaphragm control information is likely to become greater than a predetermined value, when diaphragm control information is received after reservation lens control information is received (S51). If the power consumption is likely to become greater than the predetermined value, then the lens controller 311 sets a delay amount A regarding over-power to a delay amount t1 (S53). The delay amount t1 is determined to be a value at which the power consumption becomes less than or equal to the predetermined value. If the power consumption is not likely to become greater than the predetermined value, then the lens controller 311 sets the delay amount A to 0 (S52).

Then, the lens controller 311 determines whether the drive of the diaphragm 307 is likely to interfere with the drive of the focus lens 304, when the focus lens 304 and the diaphragm 307 are simultaneously driven (S54). For example, there may be a case where vibration caused by the drive of the diaphragm 307 affects the drive of the focus lens 304. In such a case, it is not desirable to simultaneously drive the focus lens 304 and the diaphragm 307, and thus one of the focus lens 304 and the diaphragm 307 is driven and thereafter the other one is driven. When the drive of the diaphragm 307 is likely to interfere with the drive of the focus lens 304 (or vice versa), the lens controller 311 sets a delay amount B regarding interference to a delay amount t2 (S56). The delay amount t2 is determined to be a value at which the drive of the focus lens 304 and the drive of the diaphragm 307 do not interfere with each other. If interference is not likely to occur, then the lens controller 311 sets the delay amount B to 0 (S55).

Subsequently, the lens controller 311 determines whether the processing load of the lens controller 311 in a case where the focus lens 304 and the diaphragm 307 are simultaneously driven is likely to become greater than a predetermined value (S57). If the processing load of the lens controller 311 is likely to become greater than the predetermined value, then the lens controller 311 sets a delay amount C regarding an overload to a delay amount t3 (S59). The delay amount t3 is determined to be a value at which the processing load of the lens controller 311 does not become greater than the predetermined value. If the processing load of the lens controller 311 is not likely to become greater than the predetermined value, then the lens controller 311 sets the delay amount C to 0 (S58).

The lens controller 311 sets the greatest one of the delay amounts A, B, and C set in the above-described manner to a delay amount D (S60).

The lens controller 311 then starts the drive of the focus lens driver 306 and starts the drive of the diaphragm driver 308 after a lapse of time of the delay amount D from the start of the drive of the focus lens driver 306 (S61).

As described above, in the present embodiment, when a predetermined condition is satisfied, the diaphragm 307 is driven delayed by a delay amount from the drive of the focus lens 304. In this manner, even when reservation lens control information is received, the control can be performed not to perform simultaneous drive if it is not desirable to perform simultaneous drive of the focus lens 304 and the diaphragm 307.

Figure 10:
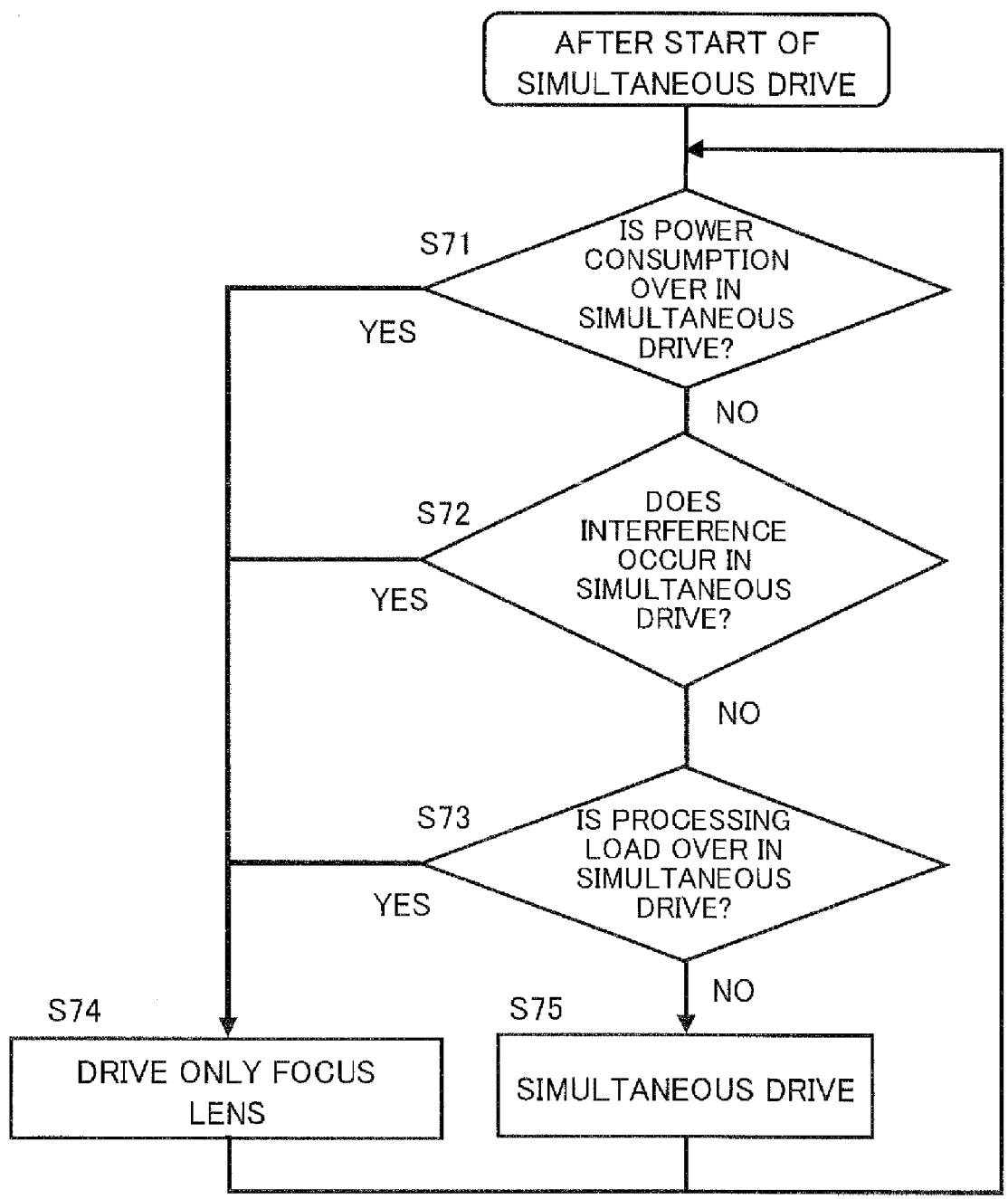
FIG. 10 is a flowchart for describing an exemplary operation of simultaneous drive of the focus lens and the diaphragm according to Second Embodiment.

FIG. 10 is a control flow after the simultaneous drive of the focus lens 304 and the diaphragm 307 starts. This control is performed continuing from the control shown in FIG. 9.

After the control shown in FIG. 9, the lens controller 311 determines whether power consumption for simultaneously driving the focus lens 304 and the diaphragm 307 is or is likely to become greater than the predetermined value (S71). If the power consumption is or is likely to become greater than the predetermined value, then the lens controller 311 performs control to drive only the focus lens 304 (S74).

If the power consumption is not or is not likely to become greater than the predetermined value, then the lens controller 311 determines whether when the focus lens 304 and the diaphragm 307 are simultaneously driven the drive of the diaphragm 307 is likely to interfere with the drive of the focus lens 304 (or vice versa) (S72). If interference is likely to occur, then the lens controller 311 performs control to drive only the focus lens 304 (S74).

If interference is not likely to occur, then the lens controller 311 determines whether when the focus lens 304 and the diaphragm 307 are simultaneously driven, the processing load of the lens controller 311 is or is likely to become greater than the predetermined value (S73). If the processing load is or is likely to become greater than the predetermined value, then the lens controller 311 performs control to drive only the focus lens 304 (S74). If the processing load of the lens controller 311 is not or is not likely to become greater than the predetermined value, then the lens controller 311 simultaneously drives the focus lens 304 and the diaphragm 307 (S75).

Figure 11:
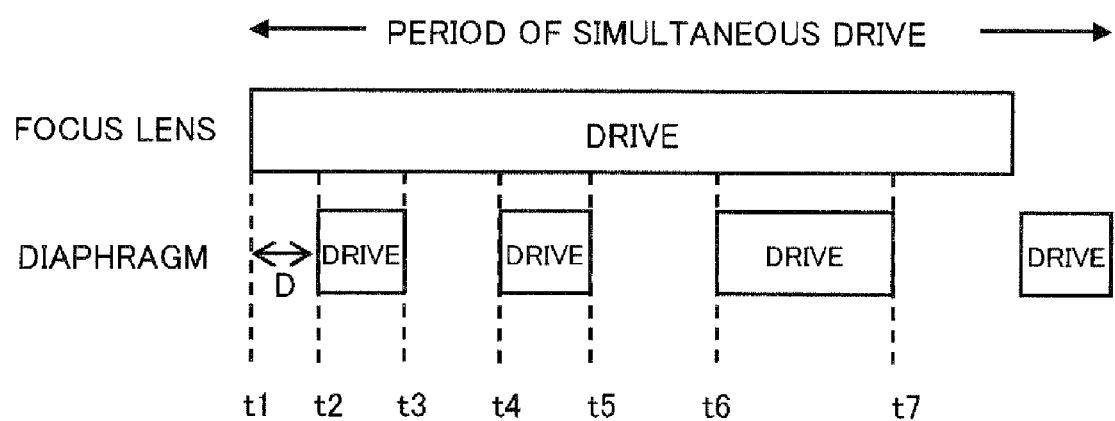
FIG. 11 is a diagram for describing control of simultaneous drive of the focus lens and the diaphragm according to Second Embodiment.

As described above, when a predetermined condition is satisfied, such as power consumption becoming greater than a predetermined value during simultaneous drive of the focus lens 304 and the diaphragm 307, the simultaneous drive is canceled and only the focus lens 304 is driven. FIG. 11 is a diagram showing an example of simultaneous drive of the focus lens 304 and the diaphragm 307 in a case where control such as shown in FIG. 9 is performed. In the example of FIG. 11, at time t2, simultaneous drive of the focus lens 304 and the diaphragm 307 starts. At time t3, at least one of conditions regarding power consumption, interference, and a processing load is satisfied, and the control is performed to stop the drive of the diaphragm 307 and drive only the focus lens 304. Thereafter, at time t4, all the conditions regarding power consumption, interference, and a processing load are canceled, the focus lens 304 and the diaphragm 307 are driven simultaneously again. As such, the lens controller 311 according to the present embodiment continues to monitor the condition regarding power consumption, interference, and a processing load even after starting simultaneous drive of the focus lens 304 and the diaphragm 307, and controls the simultaneous drive of the focus lens 304 and the diaphragm 307 according to the condition.

Due to the control as described above, power consumption for driving the focus lens 304 and the diaphragm 307 can be reduced and the focus lens 304 can be accurately controlled. Furthermore, since the processing load of the lens controller 311 can be limited to a certain range, even when the lens controller 311 has low performance, a load for processing other than the drive control of the focus lens 304 and the diaphragm 307 can be sufficiently processed.

Note that although, in the present embodiment, when simultaneous drive is canceled, the control is performed to continue the drive of the focus lens 304 and stop the drive of the diaphragm 307, vice-versa control may be performed to stop the drive of the focus lens 304 and continue the drive of the diaphragm 307.

Third Embodiment

In the present embodiment, simultaneous drive of the focus lens 304 and the diaphragm 307 related to reservation control in a continuous shooting mode will be described.

In the case of continuous shooting, a focus needs to be detected each time an image is shot. Thus, after an image is shot, in order to detect a focus for shooting a next image, the focus lens 304 needs to be moved to a predetermined position. At that time, after an image is shot, for preparation for focus detection, in addition to move the focus lens 304 to a predetermined position (a position slightly displaced from a focus position where a previous image is captured), the value of the diaphragm 307 also needs to be controlled to a predetermined aperture. That is, in such a focus detection preparation operation, the focus lens 304 and the diaphragm 307 need to be simultaneously driven. In this simultaneous drive, the reservation control according to First Embodiment can be used.

Figure 12:
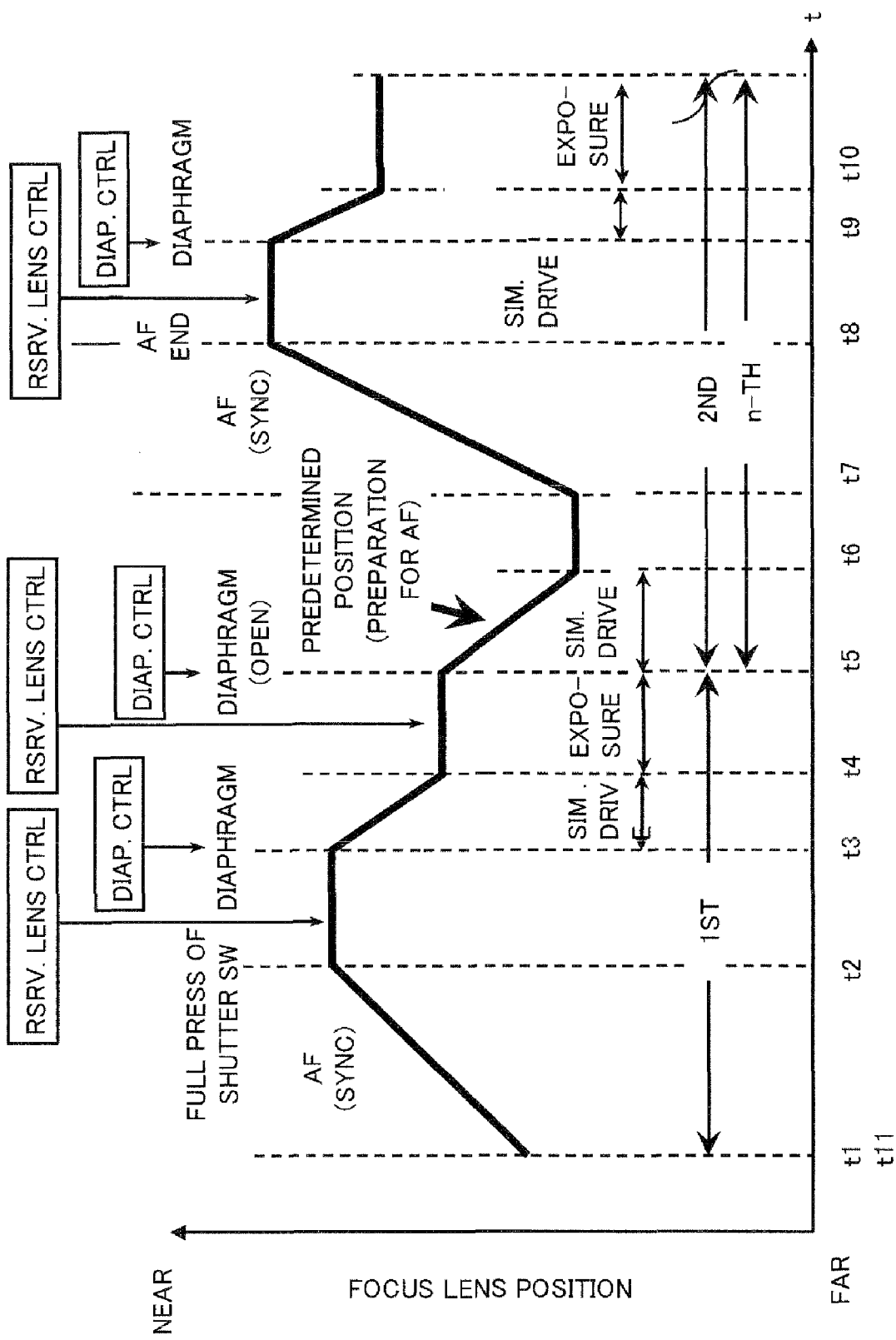
FIG. 12 is a diagram for describing an exemplary operation of reservation control at continuous shooting, according to Third Embodiment.

FIG. 12 is a diagram describing control information sent to the interchangeable lens 3 from the camera body 2 at continuous shooting and control of the focus lens 304 based on the control information. During times t1 to t5 control is performed for capturing the first image during the continuous shooting, and during times t5 to t11 control is performed for capturing the second image during the continuous shooting.

At time t2, when the shutter switch 212 is fully pressed, continuous shooting starts. When capturing of the first image ends (time t5), during times t5 and t6 preparation for an AF operation for capturing the second image is performed. Specifically, during this period, the focus lens 304 is moved to a predetermined position and the diaphragm 307 is controlled to a predetermined aperture. Hence, during a period for which the first image is exposed (times t4 and t5), reservation lens control information is sent to the interchangeable lens 3 from the camera body 2. Furthermore, at the completion of the exposure (time t5), diaphragm control information is sent to the interchangeable lens 3 from the camera body 2. At the time when the diaphragm control information is received, the interchangeable lens 3 simultaneously drives the focus lens 304 and the diaphragm 307 based on the reservation lens control information received earlier and the diaphragm control information received later, during times t5 to t6. By simultaneously driving the focus lens 304 and the diaphragm 307 as described above, a preparation operation for an AF operation for the second image can be promptly performed.

Thereafter, similarly, during an exposure period upon capturing a previous image, reservation lens control information is sent and at the completion of the exposure period diaphragm control information is sent to the interchangeable lens 3 from the camera body 2. Accordingly, a preparation operation for an AF operation for a next image can be promptly performed. Note that in FIG. 12 control for an n-th image during the continuous shooting corresponds to control performed during times t5 to t11.

Other Embodiments

As embodiments of the present invention, the above-described embodiments are exemplified. However, the embodiment is not limited to the above-described embodiments and can also be implemented in other embodiments. A summary of other embodiments of the present invention will be described below.

Although in the embodiments the CMOS sensor includes a light-receiving element, an AGC, and an AD converter, the configuration is not limited thereto and a CMOS sensor, an AGC, and an AD converter may be configured as separate units. Although configuring an imaging unit by a CMOS sensor provides an advantage in that power consumption can be reduced, the imaging unit can be configured by others as long as the imaging unit can capture a subject image to generate image data (a digital signal or electrical signal). For example, the imaging unit may be configured by a CCD image sensor.

Although the above described embodiments describe an example in which diaphragm control information is used as first control information and reservation lens control information is used as second control information, the configuration is not limited thereto. Lens control information for driving the focus lens may be used as first control information and reservation diaphragm control information for controlling the diaphragm upon receiving lens control information may be used as second control information.

In the above described embodiments, the term "simultaneous drive" encompasses drive of the focus lens and the diaphragm such that a period of driving a focus lens overlaps at least partially with a period of driving a diaphragm.

In addition, although in the above described embodiments the diaphragm is used as an example of the first movable member and the focus lens is used as an example of the second movable member, the movable members are not limited thereto. For example, a zoom lens, a correction lens, and the like may be used as the first or second movable member.

Although in the above described embodiments the number of actuators that can be simultaneously driven with one piece of reservation control information is two, a larger number of actuators may be simultaneously driven with one piece of reservation control information.

Although reservation lens control according to the above described embodiment is suitable for control for shooting a still image, needless to say, the reservation lens control can also be applied to control performed upon capturing a moving image.

Note that FIG. 13 is a diagram provided for describing the problem and is prepared for easy understanding of the present embodiment, and thus it is not a diagram showing conventional art.

Therefore, the embodiment is not limited to the above-described embodiments and can be implemented by various configurations.

INDUSTRIAL APPLICABILITY

The above described embodiment can be applied to an imaging apparatus including a camera body and an interchangeable lens. Specifically, it can be used in digital cameras, digital video cameras, and so on.

Although specific embodiments are described above, many other modifications, corrections and applications are apparent to those skilled in the art. Therefore, the possible embodiments are not limited by the disclosure provided herein. The present disclosure relates to subject matter contained in Japanese Patent Application No. 2008-145687 filed on Jun. 3, 2008, Japanese Patent Application No. 2009-1011880 filed on Apr. 20, 2009 and U.S. Provisional Patent Application No. 61/053815 filed on May 16, 2008, of which contents are expressly incorporated herein by reference.

What is claimed is:

1. An interchangeable lens mountable to a camera body, comprising:
a first movable member;
a second movable member;
a first drive unit configured to drive the first movable member;
a second drive unit configured to drive the second movable member;
an obtaining unit configured to obtain first control information and second control information from the camera body, the first control information being an instruction to control the first drive unit, the second control information being an instruction to control the second drive unit;
a storage unit configured to store the second control information when the obtaining unit obtains the second control information; and
a controller configured to control the first drive unit and the second drive unit based on the first and second control information obtained through the obtaining unit, wherein
when the obtaining unit obtains the first control information after obtaining the second control information, the controller drives the first drive unit and the second drive unit in parallel based on the obtained first control information and the stored second control information, and
the obtaining unit obtains the second control information from the camera body during a period in which control of the interchangeable lens and control of the camera body are asynchronously performed.

2. The interchangeable lens according to claim 1, wherein one of the first movable member and the second movable member is a focus lens and the other is a diaphragm.

3. The interchangeable lens according to claim 1, wherein the first and second control information obtained by the obtaining unit is sent from the camera body after the camera body receives a signal indicating start of shooting and before starting exposure in the camera body.

4. The interchangeable lens according to claim 1, wherein the first and second control information obtained by the obtaining unit in a continuous shooting mode is sent from the camera body after the camera body starts exposure of an image.

5. The interchangeable lens according to claim 1, wherein, when the obtaining unit obtains the first control information after obtaining the second control information, the controller simultaneously starts drive of the first drive unit and drive of the second drive unit based on the first control information and the second control information.

6. The interchangeable lens according to claim 1, wherein, if a predetermined condition is satisfied when the obtaining unit obtains the first control information after obtaining the second control information, the controller drives the first drive unit and the second drive unit in parallel with different drive start timings.

7. The interchangeable lens according to claim 6, wherein the predetermined condition is regarding power consumption for simultaneously driving the first drive unit and the second drive unit.

8. The interchangeable lens according to claim 6, wherein the predetermined condition is regarding whether operational interference occurs when the first drive unit and the second drive unit are simultaneously driven.

9. The interchangeable lens according to claim 6, wherein the predetermined condition is regarding a processing load of the controller for simultaneously driving the first drive unit and the second drive unit.

10. A camera body to which the interchangeable lens is mountable according to claim 1, comprising a sending unit configured to send the first control information and the second control information to the interchangeable lens.

11. An imaging apparatus comprising an interchangeable lens and a camera body to which the interchangeable lens is mounted,
the interchangeable lens comprising:
a first movable member;
a second movable member;
a first drive unit configured to drive the first movable member;
a second drive unit configured to drive the second movable member;
an obtaining unit configured to obtain first control information and second control information from the camera body, the first control information being an instruction to control the first drive unit, the second control information being an instruction to control the second drive unit;
a storage unit configured to store the second control information when the obtaining unit obtains the second control information; and
a controller configured to control the first drive unit and the second drive unit based on the first and second control information obtained through the obtaining unit,
the camera body comprising a sending unit configured to send the first control information and the second control information to the interchangeable lens, wherein
when the obtaining unit obtains the first control information after obtaining the second control information, the controller of the interchangeable lens concurrently drives the first drive unit and the second drive unit based on the obtained first control information and the stored second control information, and
the obtaining unit obtains the second control information from the camera body during a period in which control of the interchangeable lens and control of the camera body are asynchronously performed.

* * * * *